United States Patent
Lim et al.

(10) Patent No.: US 11,287,083 B2
(45) Date of Patent: Mar. 29, 2022

(54) INFORMATION HANDLING SYSTEM DISPLAY SWIVEL ARM

(71) Applicant: Dell Products L.P., Round Rock, TX (US)

(72) Inventors: Kok Lian Lim, Singapore (SG); Yu Weng Alvin Sitoh, Singapore (SG); Khang Chian Yong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 26 days.

(21) Appl. No.: 16/778,818

(22) Filed: Jan. 31, 2020

(65) Prior Publication Data

US 2021/0239262 A1 Aug. 5, 2021

(51) Int. Cl.
*F16M 13/02* (2006.01)
*F16M 11/20* (2006.01)
*F16M 11/08* (2006.01)

(52) U.S. Cl.
CPC .......... *F16M 13/022* (2013.01); *F16M 11/08* (2013.01); *F16M 11/2014* (2013.01); *F16M 2200/02* (2013.01); *F16M 2200/06* (2013.01)

(58) Field of Classification Search
CPC ............... F16M 11/2014; F16M 11/08; F16M 2200/024; F16M 2200/06; F21S 8/043; F21V 21/26
USPC ..................................................... 248/282.1
See application file for complete search history.

(56) References Cited

U.S. PATENT DOCUMENTS

| | | | | |
|---|---|---|---|---|
| 5,366,191 A | * | 11/1994 | Bekanich | A61M 5/1415 248/125.1 |
| 5,611,513 A | * | 3/1997 | Rosen | F16M 11/10 248/222.11 |
| 6,695,270 B1 | | 2/2004 | Smed | |
| 8,070,331 B2 | * | 12/2011 | Gull | F16M 13/027 362/389 |
| 9,239,127 B2 | * | 1/2016 | Kronung | F16M 11/06 |
| 9,587,792 B1 | | 3/2017 | Parsons | |
| 9,657,889 B1 | | 5/2017 | Chumakov | |
| 9,869,343 B2 | * | 1/2018 | Oginski | F16M 13/022 |
| 10,436,244 B2 | * | 10/2019 | Hung | F16M 11/2092 |
| 10,851,938 B2 | * | 12/2020 | Glickstein | F16M 11/16 |

(Continued)

OTHER PUBLICATIONS

Humanscale, "M2.1," downloaded from https://www.humanscale.com/products/product.cfm?group=m2.1 on Mar. 10, 2021 (14 pages).

*Primary Examiner* — Bradley Duckworth
(74) *Attorney, Agent, or Firm* — Zagorin Cave LLP; Robert W. Holland (57) ABSTRACT

An information handling system display swivel arm rotates about two axes with selectable amounts of rotation. The swivel arm couples to an anchor and a display support with a tool-less swivel coupling device having a member inserted into a housing and rotationally coupled in place by first and second pins that engage first and second slots of the member. The first slot is disposed around the circumference of the member to support substantially 360 degrees of rotation of the member in the housing. The second slot is disposed only part of the way around the circumference of the member to support partial rotation, such as 180 degrees. Removal of both pins from the member allows withdrawal of the member from the housing to disassemble the swivel arm.

20 Claims, 7 Drawing Sheets

(56) References Cited

U.S. PATENT DOCUMENTS

| | | |
|---|---|---|
| 2011/0147546 A1 | 6/2011 | Monsalve et al. |
| 2013/0327912 A1* | 12/2013 | Yoshida .................. H04R 1/026 248/289.11 |
| 2020/0003359 A1* | 1/2020 | Vlaar .................... G06F 1/1601 |
| 2020/0240584 A1* | 7/2020 | Priola .................... F16M 11/08 |
| 2021/0018139 A1* | 1/2021 | Xiang .................. F16M 11/128 |
| 2021/0062968 A1* | 3/2021 | Hung ................... F16M 13/022 |
| 2021/0108757 A1* | 4/2021 | Ho ......................... F16M 11/22 |

\* cited by examiner

INFORMATION HANDLING SYSTEM DISPLAY SWIVEL ARM

BACKGROUND OF THE INVENTION

Field of the Invention

The present invention relates in general to the field of information handling systems, and more particularly to an information handling system display swivel arm.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present information as visual images at a display, such as a liquid crystal display or other types of flat panel displays. Often a single information handling system can support presentation of visual images at multiple peripheral displays. End users tend to prefer large displays with greater viewing areas so that visual images are presented in more easily viewed formats. One problem with larger displays is that they tend to consume a good deal of desktop space. Another problem is that larger displays tend to weigh more and to be awkward to move, especially in relatively small workspaces, such as office cubes.

One solution that helps to maintain a clean desktop environment is a display swivel arm that holds a display in a viewing position up and away from the desktop. For instance, display swivel arms typically couple to a solid surface, such as a desk, with a clamp foot and extend the display over the desktop viewing surface with an arm that rotates about dual axes. Swivel arm display stands offer convenient movement of the display to varied positions over the desktop with a relatively large envelope of articulation. This can present some difficulty in small office spaces where the swivel arm can invade a neighbor's work space or hit adjacent walls and furniture.

Often set up of display swivel arms tends to be time consuming and difficult as the different rotating components are fitted together. Typical display swivel arm setup involves tools and loose parts that can be easily lost. A typical enterprise might set up hundreds or even thousands of display swivel arms throughout enterprise office areas. Setting up and/or moving display swivel arms often involves assembly and disassembly of arms and arm joints with a wide variety of configurations that are confusing and expensive.

SUMMARY OF THE INVENTION

Therefore, a need has arisen for a system and method which provides a tool-less set up and configuration of a display swivel arm.

In accordance with the present invention, a system and method are provided which substantially reduce the disadvantages and problems associated with previous methods and systems for deploying a display swivel arm to a work space. A swivel coupling device rotationally couples a swivel arm at opposing ends to an anchor and a display support arm with a tool-less assembly. A pin inserts from a housing into a slot of a support member to define rotational movement at the swivel coupling device and to hold the support member in the housing to prevent its disassembly.

More specifically, a display support stand supports a display bracket at one end of a display support arm that rotationally couples at an opposing end to a swivel arm. The swivel arm couples to the display support arm at one end and an anchor at an opposing end with first and second swivel coupling devices. Each swivel coupling device inserts a support member into a housing and locks the support member in place by moving a switch to engage a pin extending from the housing into a slot of the support member. The pin and slot engagement prevents disassembly of the support member from the housing while allowing rotation of the support member relative to the housing. The amount of rotation of the support member relative to the housing may be varied by changing the shape of the slot. For instance, a slot that extends a full 360 degrees about the circumference of the support member provides a full 360 degrees of rotational movement. In one example embodiment, a first slot defines substantially 360 degrees of rotation and a second slot defines 180 degrees of rotation. A switch inserts a first pin into the first slot for full rotation, a second pin into a second slot for partial rotation, and withdraws the pins from the slots to assemble and disassemble the support member in the housing without tools. In one example embodiment, a secondary swivel device provides additional rotational play to support rotational movement at rotational extremes, such as when a stop extends into a slot to restrict rotation to 360 degrees.

The present invention provides a number of important technical advantages. One example of an important technical advantage is that a display swivel arm assembles and disassembles in a simple and tool-less manner, thus saving time and trouble during deployment of display swivel arm assemblies to an enterprise environment. The swivel selection switch integrates swivel angle selection and a joint lock feature in a common switch. A single flip of the swivel selection switch lets an end user select 360 degrees of rotation or 180 degrees of rotation while locking the arm joints to prevent disassembly during use. The swivel arm need not be disassembled to change the swivel angle setting and a full 360 degrees of rotation is supported with a stop and without any dead angles.

BRIEF DESCRIPTION OF THE DRAWINGS

The present invention may be better understood, and its numerous objects, features and advantages made apparent to those skilled in the art by referencing the accompanying

DETAILED DESCRIPTION

A display swivel arm supports an information handling system display to rotate about dual parallel axes with a tool-less assembly and disassembly. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
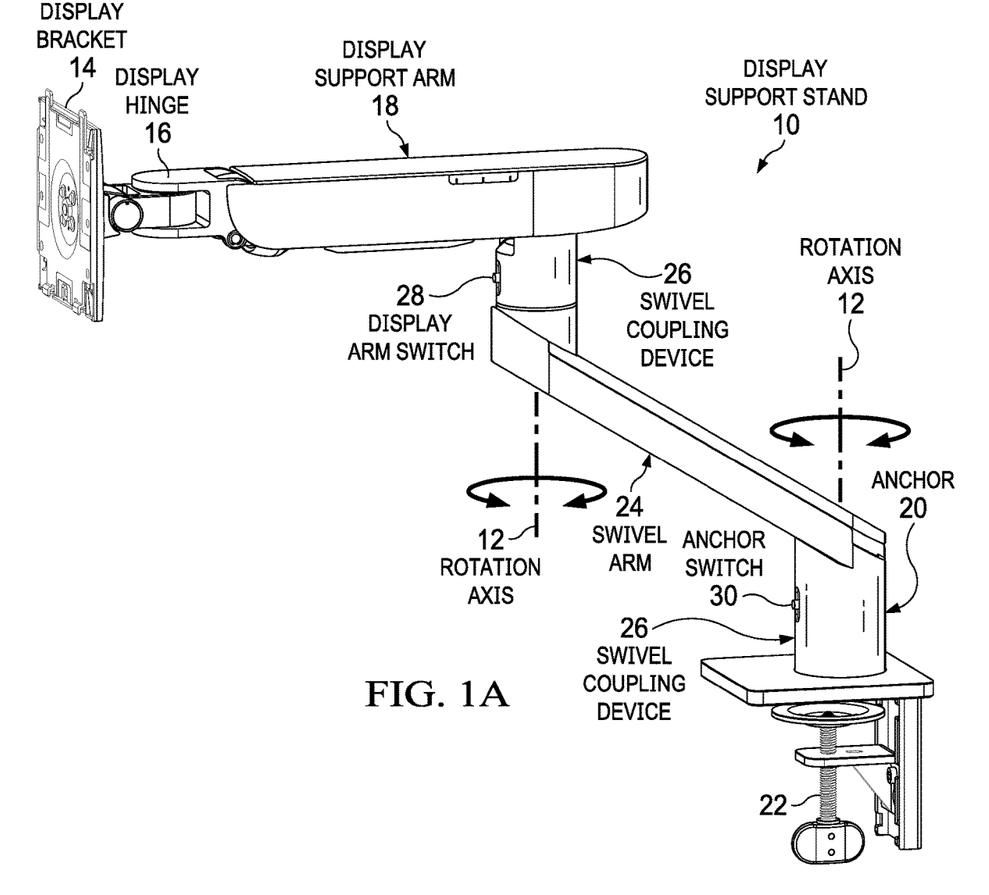
FIGS. 1A, 1B and 1C depict a side perspective view of a display support stand having dual rotation axes.
Figure 1B:
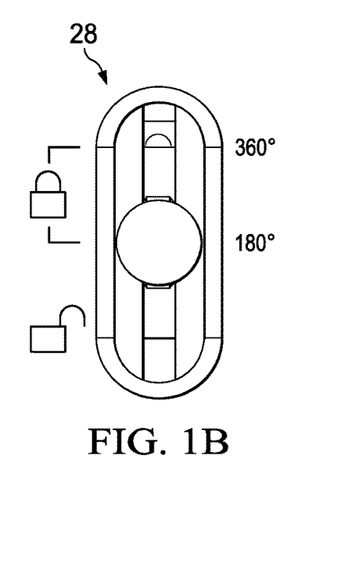
Figure 1C:
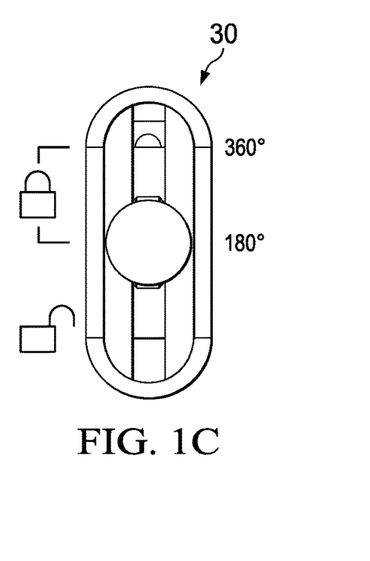

Referring now to FIG. 1A, a side perspective view depicts a display support stand 10 having dual rotation axes 12. A display bracket 14, such as a VESA standard bracket, coupled by display hinge 16 to a display support arm 18. A display supported by display bracket 14 is held in a viewing position with the viewing angle adjustable by display hinge 16. Display support stand couples to a support surface, such as a desktop, with an anchor 20, such as a threaded bracket 22 depicted in the example embodiment. To vary the position of display bracket 14 relative to anchor 20, a swivel arm 24 couples with a first swivel coupling device 26 to anchor 20 and with a second swivel coupling device 26 to display support arm 18. Each swivel coupling device 26 supports rotation about a rotational axis 12 with a selectable amount of rotational movement. In the example embodiment, a display arm switch 28 expanded in FIG. 1B selects 360 degrees of rotation of display support arm 18 in an upper position, 180 degrees of motion in a middle position, and an unlocked configuration is a lower position. The unlocked configuration releases display support arm 18 from swivel arm 24 for tool-less disassembly. Anchor switch 30 expanded in FIG. 1C provides the same functionality with the three positions for rotation of swivel arm 24 about anchor 20 and release of swivel arm 24 from anchor 20. As is explained in greater depth below, tool-less assembly of swivel arm 24 to display support arm 18 and anchor 20 is supported with the unlocked positions of display arm switch 28 and anchor switch 30. After assembly, movement of display arm switch 28 and anchor switch 30 to the 180 degree or 360 degree position rotationally couples the swivel arm to display support arm 18 and anchor 20 to prevent inadvertent disassembly.

Figure 2A:
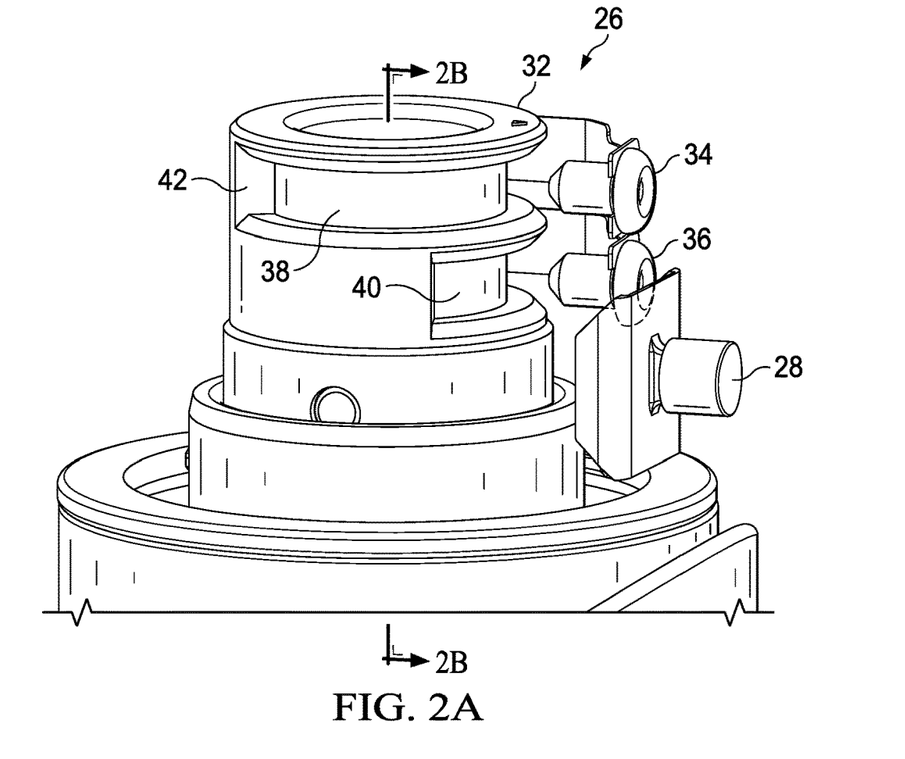
FIGS. 2A and 2B depict a swivel coupling device configured in an unlocked position.
Figure 2B:
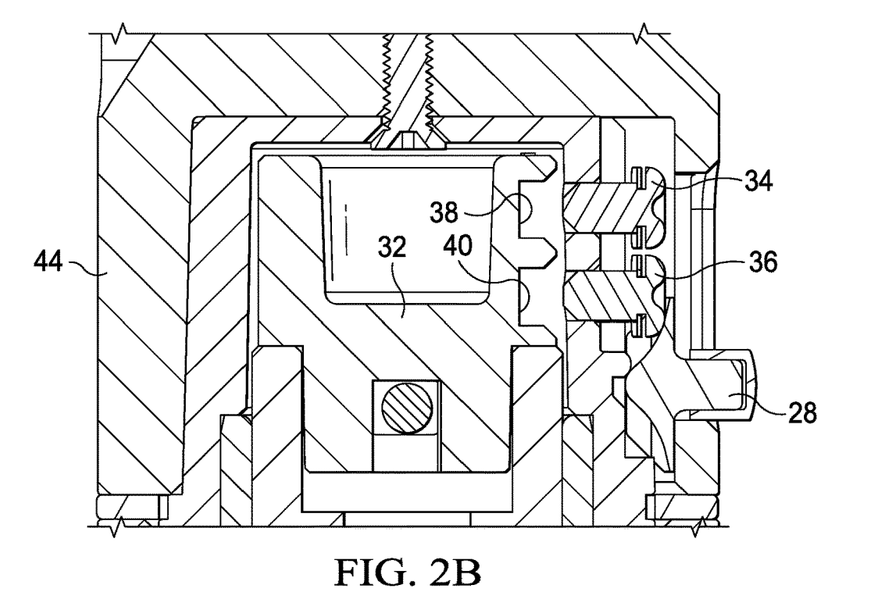

Referring now to FIGS. 2A and 2B, a swivel coupling device is depicted configured in an unlocked position. FIG. 2A depicts a support member 32 that extends out of both ends of swivel arm 24 to slide into a housing 44 as depicted by FIG. 2B. Support member 32 aligns a full rotation slot 38 with a full rotation pin 34 of switch 28, and a partial rotation slot 40 with a partial rotation pin 36 of switch 28. Full rotation slot 38 supports substantially 360 degrees of rotation of support member 32 relative to housing 44 when switch 28 inserts full rotation pin 34 in. A stop 42 stops rotation from exceeding 360 degrees. Partial rotation slot 40 supports substantially 180 degrees of rotation of support member 32 relative to housing 44 when switch 28 inserts partial rotation pin 36 in. With both pins 34 and 36 extracted from support member 32, swivel coupling device 26 disassembles by sliding support member 32 out of housing 44. In the example embodiment, support member 32 extends out of both ends of the swivel arm to insert into housings 44 formed at the anchor and display support arm. In alternative embodiments, support member 32 may extend from the anchor and display support arm to insert into a housing 44 integrated in each of opposing ends of the swivel arm.

Figure 3A:
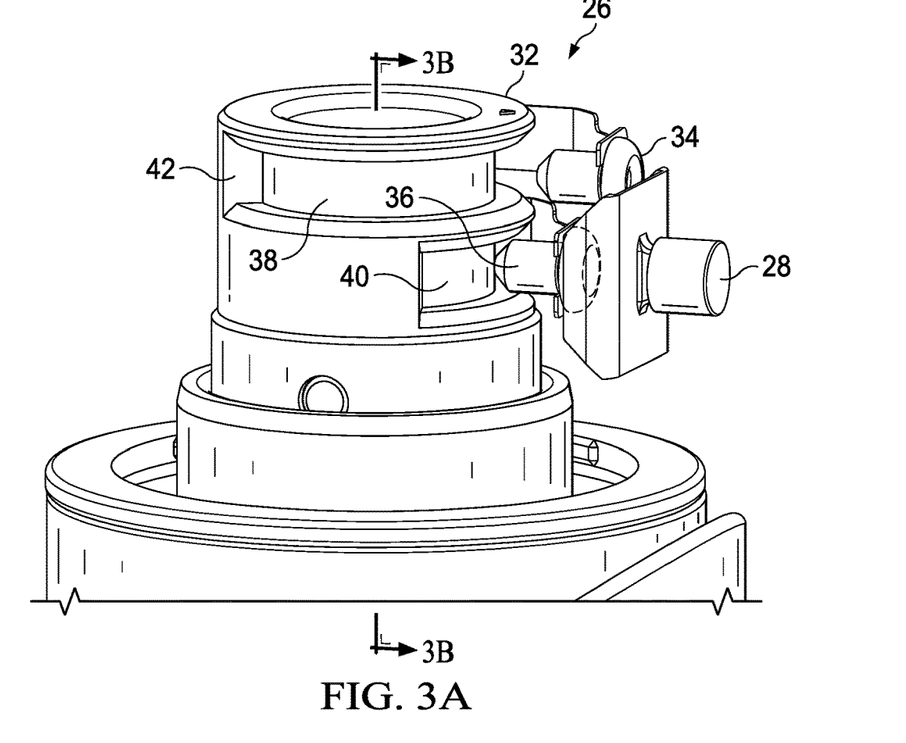
FIGS. 3A and 3B depict a swivel coupling device configured in a locked position for partial rotation.
Figure 3B:
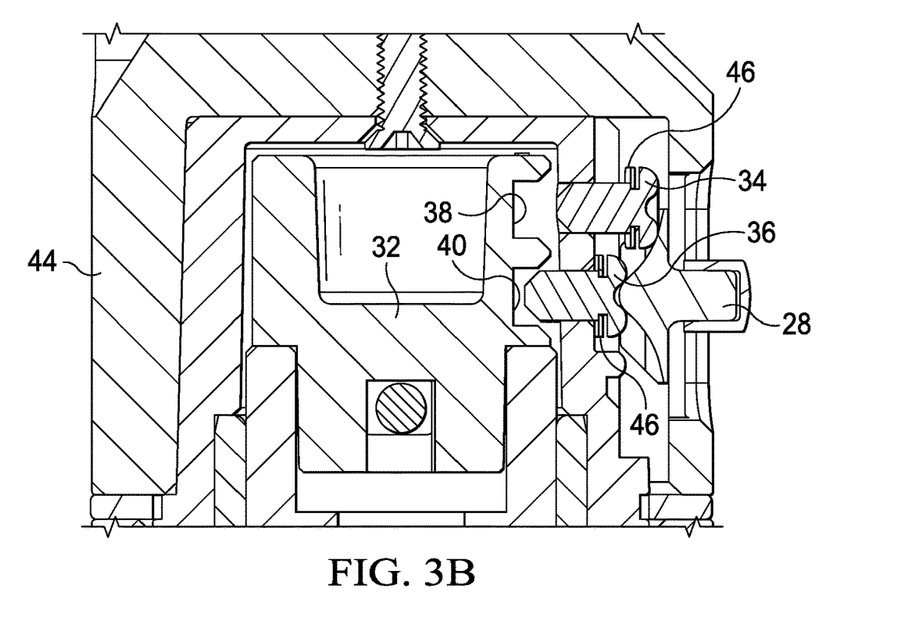

Referring now to FIGS. 3A and 3B, a swivel coupling device is depicted configured in a locked position for partial rotation. In the example embodiment, switch 28 is slid to a middle position to insert partial rotation pin 36 into partial rotation slot 40 so that support member 32 rotates 180 degrees relative to housing 44. In various embodiments, the amount of rotation may be varied from 180 degrees by altering the shape of slot 40. Switch 28 has a nipple shape that inserts at a detent of partial rotation pin 36 to bias switch 28 to remain in the selected position. Springs 46 bias each of the pins towards switch 28 and out of the slots. When configured with partial rotation pin 36 inserted into partial rotation slot 40, support member 32 is rotationally coupled in housing 44 with the engagement of partial rotation pin 36 in partial rotation slot 40 preventing disassembly of support member 32 from housing 44.

Figure 4A:
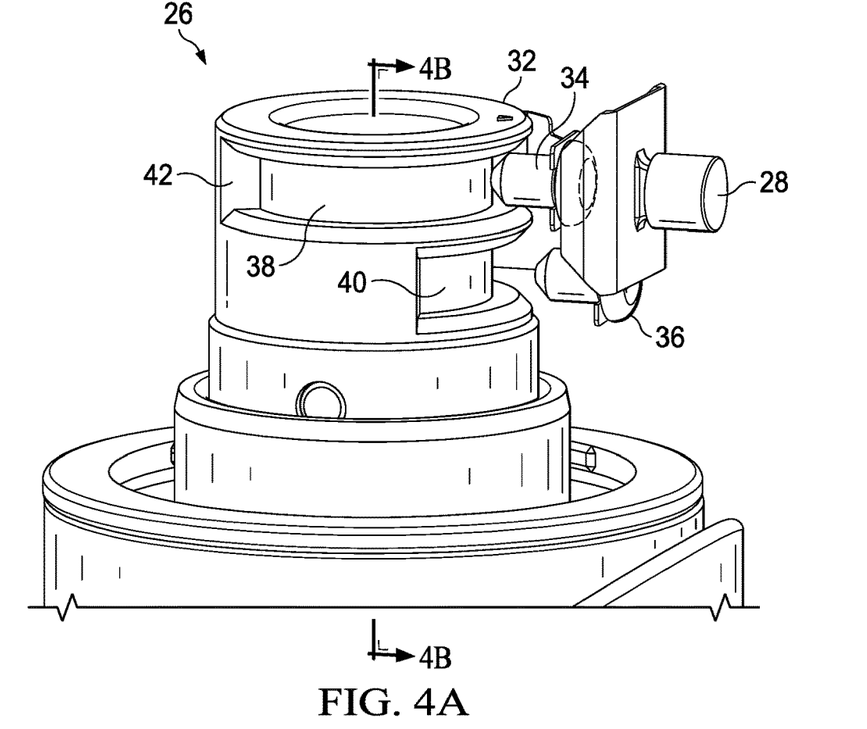
FIGS. 4A and 4B depict a swivel coupling device configured in a locked position for full rotation.
Figure 4B:
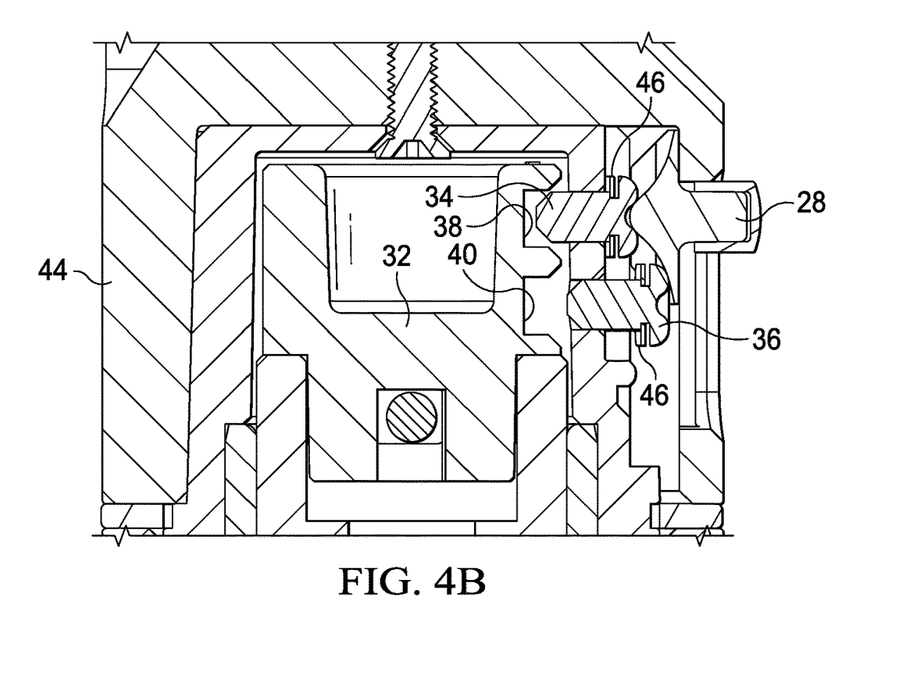

Referring now to FIGS. 4A and 4B, a swivel coupling device is depicted configured in a locked position for full rotation. In the example embodiment, switch 28 has slid to the full rotation position to insert full rotation pin 34 into full rotation slot 38 support rotation of substantially 360 degrees. Full rotation pin 34 rotationally couples support member 32 to housing 44 to prevent disassembly of support member 32 from housing 44.

Figure 5A:
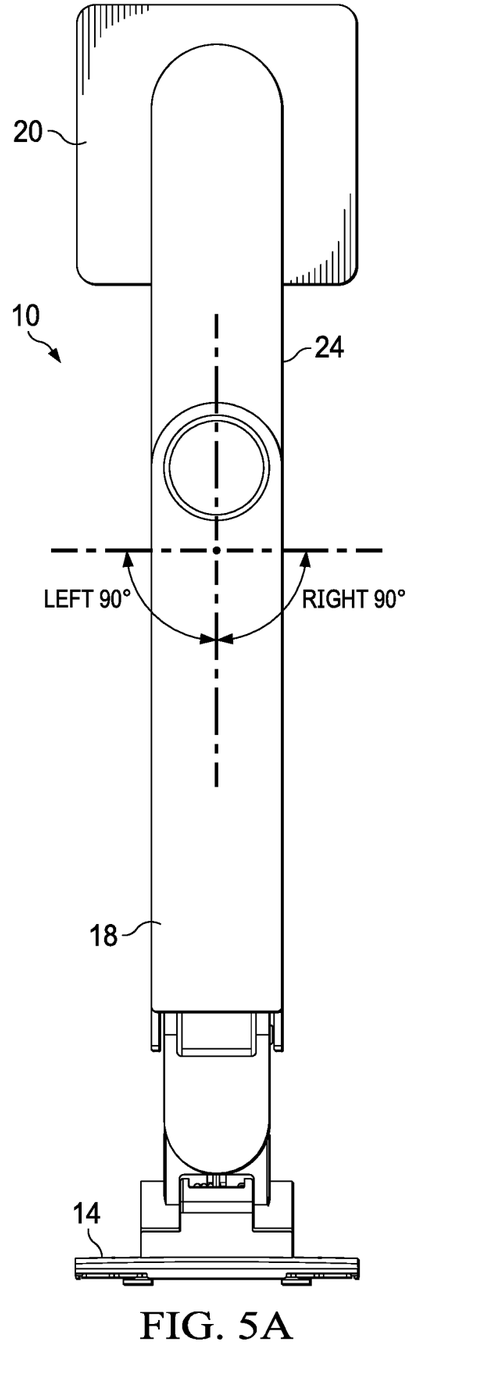
FIGS. 5A and 5B depict a top view of the display support stand to illustrate rotation provided about each rotational axis.
Figure 5B:
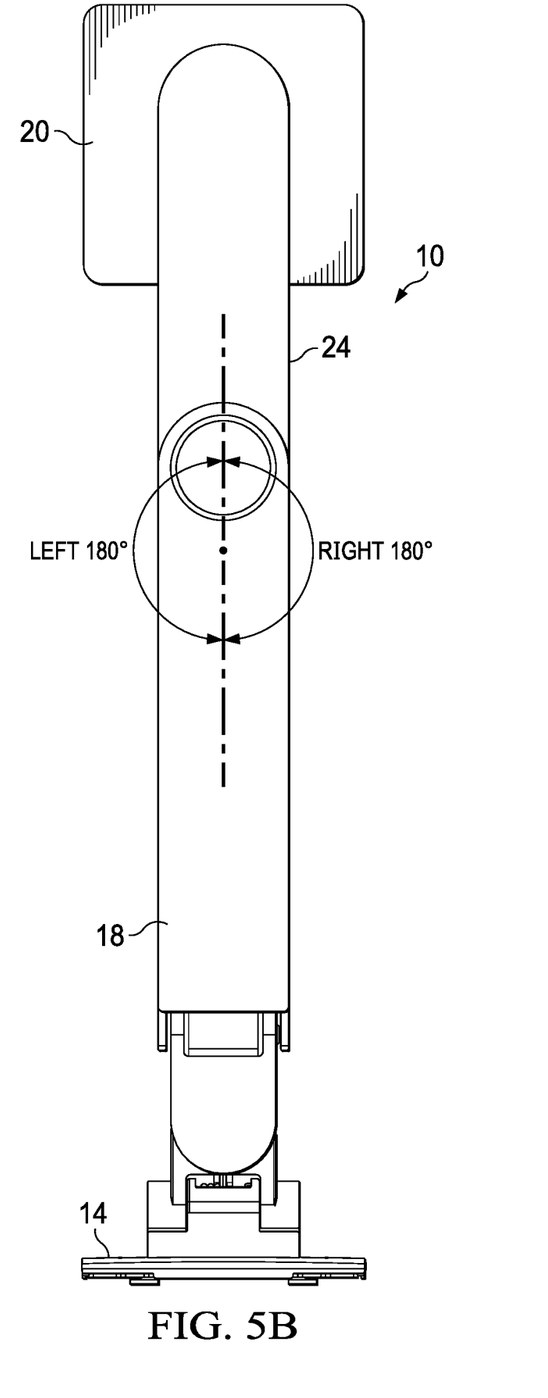

Referring now to FIGS. 5A and 5B, a top view of display support stand 10 illustrates rotation provided about each rotational axis. FIG. 5A depicts rotation of substantially 180 degrees when the switch selects 180 degrees of rotation. FIG. 5B depicts rotation of substantially 360 degrees when the switch selects 360 degrees of rotation. By selectively narrowing the amount of rotation, an end user can configure the display stand to limited spaces that help to avoid impact of the display stand against walls and objects.

Figure 6A:
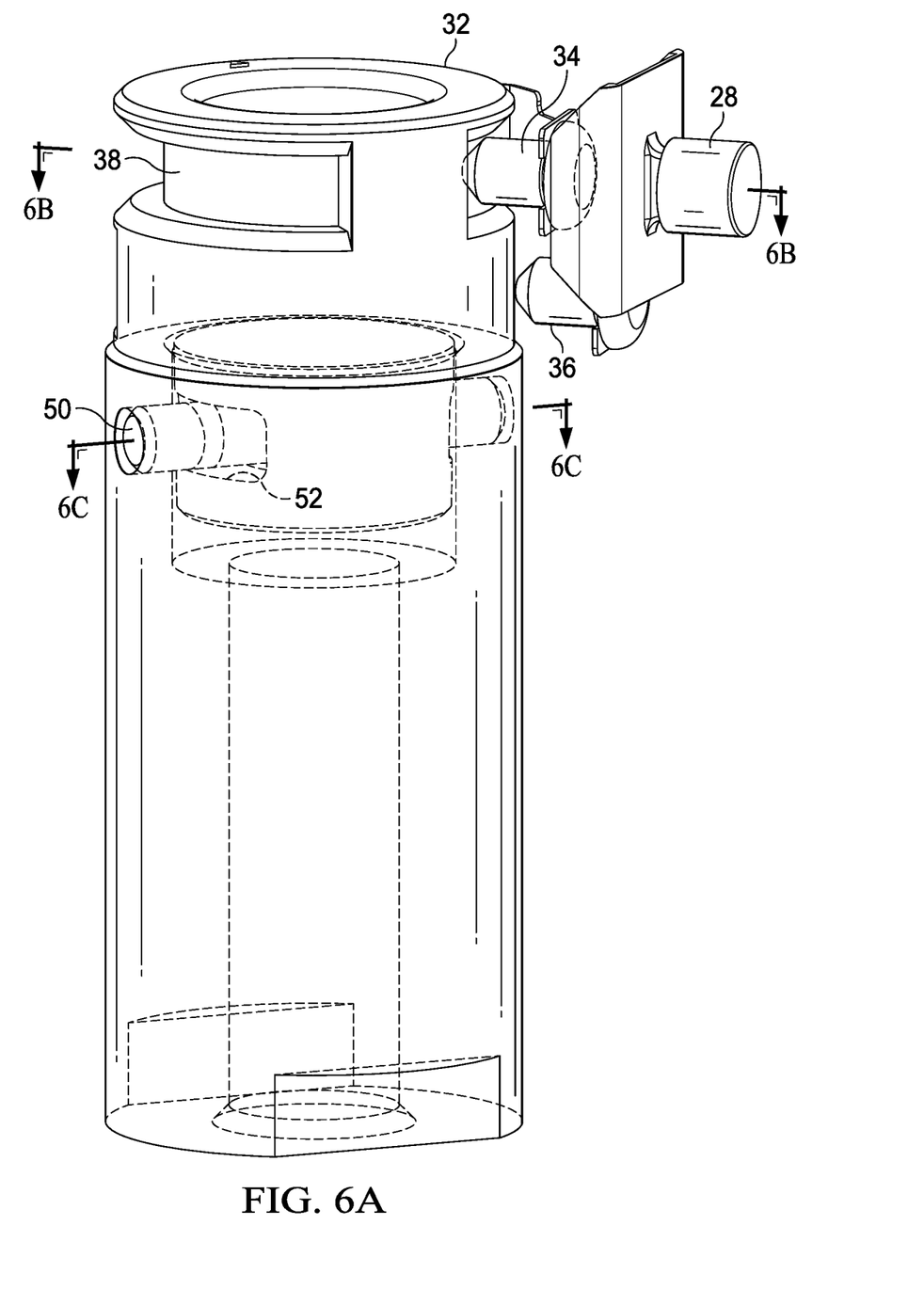
FIGS. 6A, 6B and 6C depict an example embodiment of a secondary swivel arrangement that provides a full 360 degrees of rotation at a swivel coupling device.
Figure 6B:
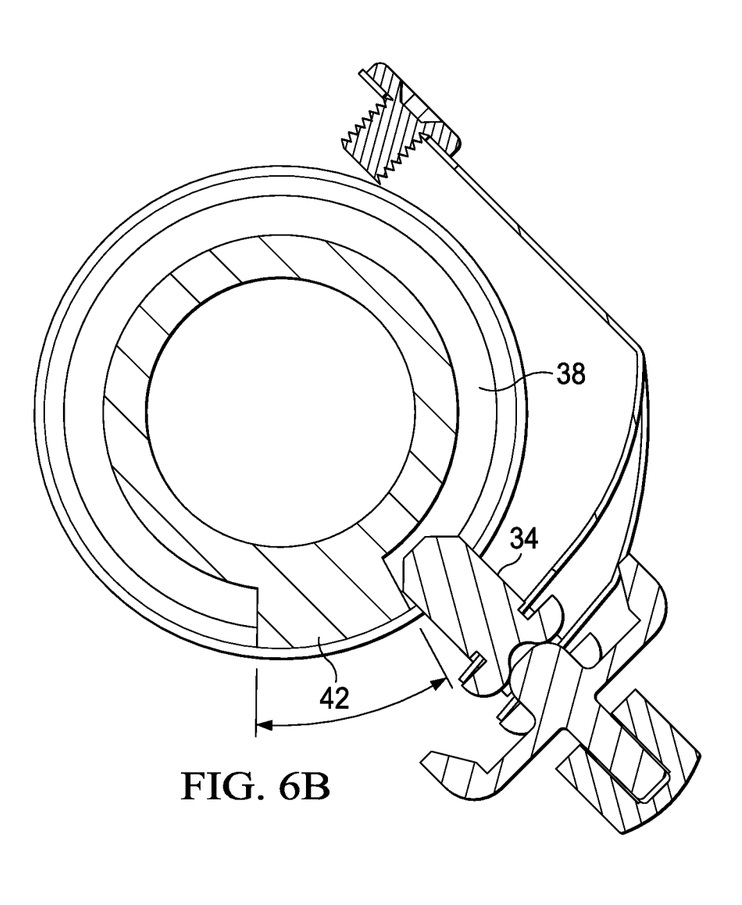
Figure 6C:
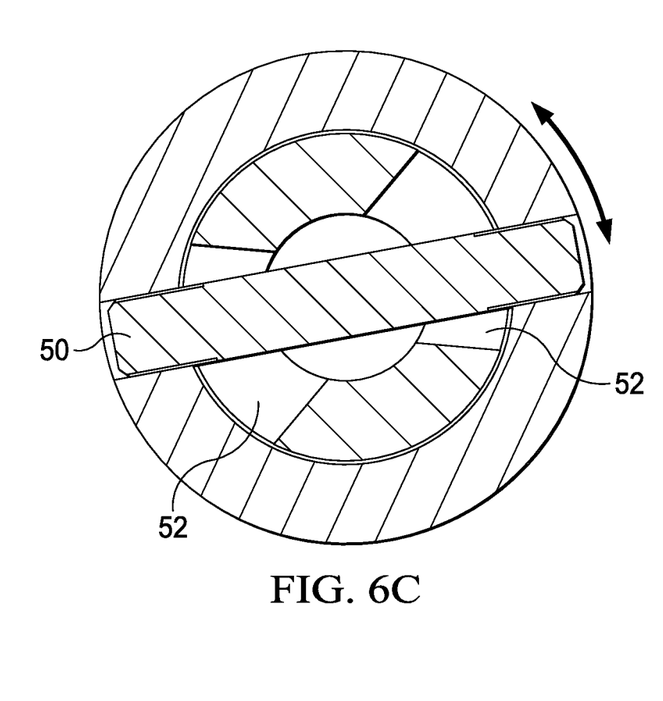

Referring now to FIGS. 6A, 6B and 6C, an example embodiment depicts a secondary swivel arrangement that provides a full 360 degrees of rotation at a swivel coupling device. As described above and depicted in FIG. 6A, full rotation pin 34 inserts into full rotation slot 38 to support substantially 360 degrees of rotation of support member 32 relative to housing 44. The cross sectional view of FIG. 6B illustrates that stop 42 consumes some portion of full rotation slot 38 so that a complete 360 degrees of rotation is prevented. The cross sectional view of FIG. 6C illustrates extra rotational play provided by engagement of a secondary stop 50 in a secondary opening 52 so that a full 360 degrees of rotation is provided. For instance, when full rotation pin 34 contacts stop 42, secondary stop 50 provides some additional rotational movement at secondary opening 52 to allow a full 360 degrees of rotational movement at the swivel coupling device 26.

Although the present invention has been described in detail, it should be understood that various changes, substitutions and alterations can be made hereto without departing from the spirit and scope of the invention as defined by the appended claims.

What is claimed is:

1. A display support comprising:
   an anchor configured to couple to a support;
   a display support terminating at one end with a display bracket operable to couple to a display;
   a swivel arm configured to couple at a first end to the anchor and at a second end to the display support; and
   first and second swivel coupling devices, the first swivel coupling device rotationally coupling the swivel arm to the anchor, the second swivel coupling device rotationally coupling the swivel arm to the display support;
   wherein each swivel coupling device comprises a member inserted into a housing having an opening and a switch extending from the housing interior through the opening and exposed at an exterior of each swivel coupling device, the switch having an interior extension, the member having a circumference with first and second slots, the switch having a first pin aligned with the first slot and a second pin aligned with the second slot, the switch sliding to a first position that aligns the extension to engage against the first pin and push the first pin in the first slot to rotate the member relative to the housing as defined by a first shape of the first slot, the switch sliding to a second position that aligns the extension to engage against the second pin and push the second pin in the second slot to rotate the member relative to the housing as defined by a second shape of the second slot, and the switch sliding to a third position that misaligns the extension with the first and second pins and retracts the first and second pins to release the member for removal from the housing.

2. The display support of claim 1 wherein the first and second swivel coupling devices comprise:
   the first swivel coupling device member and the second swivel coupling device member couple at opposing ends of the swivel arm;
   the first swivel coupling device housing couple at the anchor; and
   the second swivel coupling device housing couple at the display support.

3. The display support of claim 1 wherein the first and second swivel coupling devices comprise:
   the first swivel coupling device housing and the second swivel coupling device housing couple at opposing ends of the swivel arm;
   the first swivel coupling device member couple at the anchor; and
   the second swivel coupling device member couple at the display support.

4. The display support of claim 1 wherein the first shape comprises a ring of 360 degrees.

5. The display support of claim 4 further comprising a stop disposed in the first shape to stop rotation of the member relative to the housing at substantially 360 degrees.

6. The display support of claim 1 wherein the second shape comprises a ring of 180 degrees.

7. The display support of claim 1 wherein the first and second swivel coupling devices rotate about first and second parallel axes.

8. The display support of claim 1 wherein the switch further comprises:
   a sliding push button;
   wherein the first position aligns the push button and the first pin, the second position aligns the push button and the second pin, and the third position misaligns the push button from the first and second pins.

9. The display support of claim 8 further comprising:
   biasing the first pin towards the switch with a first spring; and
   biasing the second pin towards the switch with a second spring.

10. A method for coupling a display support swivel arm, the method comprising:
    inserting a first housing over a first member to rotationally couple the swivel arm to an anchor, the first housing having an opening;
    sliding a first switch extending through the first housing opening from an interior of the housing and exposed at the anchor to align an extension of the switch disposed in an interior of the anchor with a first pin to insert the first pin from the first housing into a first slot of the first member, the first pin engaging the swivel arm and anchor to lock the swivel arm on the anchor; and
    rotating the swivel arm relative to the anchor with a motion defined by a first shape of the first slot.

11. The method of claim 10 further comprising:
    sliding the first switch to misalign the extension of the switch and the first pin to remove the first pin from the first slot and to align the extension of the switch and a second pin to insert the second pin from the first housing into a second slot of the first member, the second pin engaging the swivel arm and anchor to lock the swivel arm on the anchor; and
    rotating the swivel arm relative to the anchor with a motion defined by a second shape of the second slot.

12. The method of claim 11 further comprising:
    sliding the first switch to misalign the extension of the switch with both the first pin and the second pin to remove the second pin from the second slot; and
    withdrawing the member out of the housing.

13. The method of claim 11 further comprising:
    inserting a second housing over a second member to rotationally couple the swivel arm to a display support;
    sliding a second switch to insert a first pin of the second housing from the second housing into a first slot of the second member, the first pin of the second housing engaging the swivel arm and display support to lock the swivel arm on the display support; and
    rotating the swivel arm relative to the display support with a motion defined by a first shape of the first slot of the second member.

14. The method of claim 13 further comprising:
    sliding the second switch to remove the first pin of the second housing from the first slot of the second member and insert a second pin of the second housing from the second housing into a second slot of the second member, the second pin of the second housing engaging the swivel arm and display support to lock the swivel arm on the display support; and rotating the swivel arm relative to the display support with a motion defined by a second shape of the second slot.

15. The method of claim 14 further comprising:

sliding the second switch to remove the second pin of the second member from the second slot; and withdrawing the second member out of the second housing.

16. The method of claim 14 wherein:

the shape of the first slot provides substantially 360 degrees of rotation; and the shape of the second slot provides substantially 180 degrees of rotation.

17. The method of claim 10 wherein the first and second members rotate about parallel axes.

18. A swivel coupling device comprising:

a housing having an inner circumference;

a member inserted in the housing and having first and second slots;

a switch coupled to the housing and extending through an opening in the housing, the switch sliding between three positions, a first position inserting a first pin into the first slot to rotationally couple the member to the housing, a second position inserting a second pin into the second slot to rotationally couple the member to the housing, and the third position removing the first and second pins from the first and second slots for withdrawal of the member from the housing.

19. The swivel coupling device of claim 18 wherein the first slot provides substantially 360 degrees of rotation of the member and housing.

20. The swivel coupling device of claim 19 wherein the second slot provides substantially 180 degrees of rotation of the member and housing.

* * * * *